United States Patent [19]
Powell et al.

[11] Patent Number: 5,427,235
[45] Date of Patent: Jun. 27, 1995

[54] HIGH BARRIER PACKAGES FOR SMOKING ARTICLES AND OTHER PRODUCTS

[75] Inventors: Mark S. Powell, Winston-Salem; Max Martin, Jr., Taylorsville, both of N.C.

[73] Assignee: R. J. Reynolds Tobacco Company, Winston-Salem, N.C.

[21] Appl. No.: 806,964

[22] Filed: Dec. 12, 1991

Related U.S. Application Data

[63] Continuation-in-part of Ser. No. 525,373, May 17, 1990, which is a continuation-in-part of Ser. No. 513,520, Apr. 23, 1990, abandoned.

[51] Int. Cl.⁶ .......................................... B65D 85/10
[52] U.S. Cl. ................................. 206/245; 206/271; 206/484; 229/87.13
[58] Field of Search .............. 206/242, 245, 271, 273, 206/274, 484; 428/203, 204, 349, 458, 35.2, 35.3; 229/87.13

[56] References Cited

U.S. PATENT DOCUMENTS

| | | |
|---|---|---|
| 1,117,015 | 11/1914 | Falk . |
| 1,702,325 | 2/1929 | Sickels . |
| 1,973,391 | 9/1934 | Reynolds et al. . |
| 2,026,239 | 9/1934 | Luckett . |
| 2,124,231 | 7/1938 | Kittredge et al. . |
| 2,152,398 | 3/1939 | Chalmers . |
| 2,874,891 | 2/1959 | Kelsall . |
| 3,135,459 | 6/1964 | Sherrill .............................. 229/87.13 |
| 3,164,248 | 1/1965 | Cunningham ..................... 206/273 |
| 3,237,843 | 3/1966 | Reed et al. . |
| 3,265,287 | 8/1966 | Hovland . |
| 3,301,468 | 1/1967 | Staley . |
| 3,333,683 | 8/1967 | Scharre . |
| 3,438,566 | 4/1969 | Mahon . |
| 3,606,139 | 9/1971 | Arscott . |
| 3,859,110 | 1/1975 | Foster et al. . |
| 3,952,868 | 4/1976 | Muller et al. . |
| 4,119,196 | 10/1978 | Flaherty .......................... 206/273 X |
| 4,166,973 | 9/1979 | Lilly, Jr. et al. . |
| 4,180,201 | 12/1979 | Focke . |
| 4,225,040 | 9/1980 | Focke et al. . |
| 4,293,068 | 10/1981 | Focke et al. . |
| 4,294,642 | 10/1981 | Foche et al. ................. 206/245 X |
| 4,300,676 | 11/1981 | Focke et al. . |

(List continued on next page.)

FOREIGN PATENT DOCUMENTS

| | | |
|---|---|---|
| 217523 | 9/1986 | European Pat. Off. . |
| 2206118 | 1/1971 | Germany . |
| 3632376 | 3/1988 | Germany . |
| 311565 | 6/1976 | Japan . |
| 40030 | 9/1982 | Japan . |
| 37726 | 9/1987 | Japan . |

OTHER PUBLICATIONS

Packaging Technology, Metallized Film Laminations Offers Bright Future for Board Converters (Sep. 1983).
European Search Report, Jul. 2, 1991, EP 91 10 6395, 2 pages.

*Primary Examiner*—Jacob K. Ackun
*Attorney, Agent, or Firm*—Grover M. Myers; George C. Myers, Jr.

[57] ABSTRACT

A high barrier sealable packaging material and a high barrier heat sealed package for smoking articles, such as cigarettes and the like, are disclosed. The packaging material comprises a base layer of a polymeric film, such as a biaxially oriented polyethylene terephthalate (PET) film which has been metallized on one surface thereof with a layer of metal, such as aluminum. The metallized film is then imprinted with ink with a design and/or printed matter on either the metallized or unmetallized surface. Subsequently to or concurrently with the printing, a heat seal layer is applied to the printed and/or unprinted surface for forming a heat seal about which the material is wrapped. In one embodiment, the high barrier packaging material is used as an overwrap for a cigarette package having a tear tape for removing one end of the overwrap. In another embodiment, the high barrier packaging material is used as an overwrap for a carton containing a plurality of cigarette packages and having a tear tape for removing one end of the carton overwrap.

19 Claims, 3 Drawing Sheets

U.S. PATENT DOCUMENTS

| | | | |
|---|---|---|---|
| 4,303,155 | 12/1981 | Focke et al. | |
| 4,363,851 | 12/1982 | Mishina et al. | 428/333 |
| 4,493,872 | 1/1985 | Funderburk et al. | 428/334 X |
| 4,522,887 | 6/1985 | Koebisu et al. | 229/87.07 X |
| 4,720,423 | 1/1988 | Fraser | 428/313.3 X |
| 4,741,957 | 5/1988 | Park | 428/349 |
| 4,776,461 | 10/1988 | Focke et al. | |
| 4,789,060 | 12/1988 | Focke et al. | |
| 4,800,903 | 1/1989 | Ray et al. | 131/273 |
| 4,807,745 | 2/1989 | Langley et al. | 206/245 |
| 4,818,609 | 4/1989 | Schmoock | 428/336 |
| 4,880,695 | 11/1989 | Rudd et al. | 428/341 |

HIGH BARRIER PACKAGES FOR SMOKING ARTICLES AND OTHER PRODUCTS

CROSS-REFERENCE TO RELATED APPLICATIONS

This is a continuation-in-part of U.S. patent application Ser. No. 07/525,373 filed May 17, 1990, which is a continuation-in-part of U.S. patent application Ser. No. 07/513,520 filed Apr. 23, 1990, now abandoned.

FIELD OF THE INVENTION

The present invention relates to high barrier heat sealed packages especially for smoking articles, such as cigarettes.

DESCRIPTION OF THE PRIOR ART

Popular smoking articles such as cigarettes have a substantially cylindrical rod shaped structure and include a charge of smokable material such as shredded tobacco (e.g., cut filler) surrounded by a paper wrapper thereby forming a so-called "tobacco rod." It has become desirable to manufacture cigarettes having cylindrical filter elements aligned in an end-to-end relationship with the tobacco rod. Typically, filter elements are manufactured from fibrous materials such as cellulose acetate and plug wrap, and are attached to the tobacco rod using a circumscribing tipping material. Such cigarettes having filter elements are referred to as "filter cigarettes."

Filter cigarettes conventionally have been sold in packages, each package normally containing twenty (20) cigarettes. Typical cigarette packages have a generally rectangular parallelepiped form. One type of popular cigarette package employs a container having the form of a so-called "hard pack," "crush proof box" or "hinged lid package." Another type of popular cigarette package employs a container having the form of the so-called "soft pack." Both types of cigarette packages are normally packed in cartons also of generally rectangular parallelepiped form, typically ten (10) packages to a carton.

The aforementioned types of conventional cigarette packages are designed to maintain the freshness and moisture content of the cigarettes and to protect the cigarettes from adverse environmental conditions which could degrade the freshness and quality of the cigarettes. Such conventional cigarette packages typically comprise three separate wrappings: (1) an inner foil liner comprising a metal foil laminated to a paper substrate or a metallized paper which is wrapped about the cigarettes and folded, but not sealed, at the ends of the cigarettes; (2) a "soft" or "hard" paper or paperboard package which is usually imprinted with brand specific information; and (3) an exterior clear overwrap of a heat sealable polymeric film which is heat sealed.

A strip of polymeric material known as a "tear tape" is provided for easy opening of the polymeric overwrap films. The tear tape is positioned adjacent and parallel to the top edge of the package. One end of the tear tape normally projects slightly from the package as a tab. To open the package, the tab is pulled by the smoker to open the polymeric overwrap. In particular, the projecting tab of the tear tape is pulled to slit the polymeric overwrap along both edges of the tear tape and the polymeric overwrap covering the top of the container is removed. The top of the package is then opened, i.e., the foil inner liner is torn open in the case of the soft pack or the hinged lid of the hard pack is pivoted open and a portion of the foil inner liner is removed to expose the ends of the cigarettes contained therein. The smoker then grasps the end, usually the filter end, of a cigarette with his/her fingers to remove it from the package.

Typically, the polymeric overwrap material comprises an oriented polypropylene (OPP) which may be (a) a heat seal modified oriented polypropylene, (b) an acrylic heat seal coated polypropylene, or (c) a coextruded ABA type OPP film wherein the A layers are fusion heat sealable polypropylene/polyethylene copolymer and the B layer is an oriented homopolymer of polypropylene. The composition of the heat seal layers is selected to optimize the heat sealing characteristics of the overwrap, i.e., the lowest practicable heat seal temperature and the shortest practicable dwell time. At the same time, however, the heat seal layer of the overwrap normally provides the necessary slip or antistick characteristics so that overwrapped cigarette packages readily slip or slide relative to one another during the manufacturing process and during dispensing of the cigarette packages, for example, from a cigarette vending machine. Accordingly, selection of the heat seal layer composition is essentially a trade off between optimum heat seal characteristics and optimum slip characteristics.

Under normal storage conditions and normal shelf life, the conventional cigarette package described above is capable of maintaining the freshness and moisture content of the cigarettes at an acceptable level for a limited period of time. However, if the cigarette packages are exposed to a longer than normal shelf life, or if the cigarette packages are stored in unusually hot and/or dry atmospheric conditions, the conventional package does not adequately preserve the freshness and moisture content of the cigarettes. In particular, the foil inner liner of the conventional cigarette package has a primarily decorative purpose inasmuch as the paper-backed foil liner is only overlapped at its longitudinal seam and folded over on the top and bottom of the package without sealing. Thus, the foil inner liner provides little or no barrier to the passage of oxygen and moisture between the cigarettes in the pack and the surrounding atmosphere. While the barrier effectiveness of the conventional heat sealed OPP overwrap is significantly greater than the conventional foil inner liner, the conventional overwrap does permit loss of moisture and flavor over a period of weeks so that the consumer can ascertain a change in the freshness of the product. If an extended shelf life or storage under adverse temperature and humidity conditions is encountered, there can result a staleness of the tobacco, a moisture loss, and a loss of tobacco flavor or aroma, including a loss of flavor additives, such as menthol.

Various packaging overwraps and inner liners have been proposed for improving the barrier properties of cigarette packages. For example, U.S. Pat. No. 3,948,389 to Molins et al. discloses an air impervious inner liner for a cigarette package wherein an air impervious tube is sealed flat with the resulting margin and triangulated ends being folded against the packet. Because of the resulting unusual end flap structure, the packages cannot be sealed by current cigarette package manufacturing equipment.

U.S. Pat. No. 4,375,260 to Focke et al. discloses a laminated foil inner liner which, as in the case of the aforementioned Molins et al. patent, has an unusual end flap structure and cannot therefore be made by conventional cigarette packaging equipment. In addition, the Focke et al. inner liner has an easy opening preforated feature which can result in severing of the impervious foil layer thereby reducing the barrier properties of the inner liner.

U.S. Pat. No. 4,807,745 to Langley et al. is assigned to the assignee of this invention, and discloses a barrier heat sealed package for cigarettes. The package material comprises a relatively thick laminate made of a foil layer to which two layers of biaxially oriented polypropylene homopolymer are adhesively bonded on opposite sides and exterior and interior surface layers of a heat sealable thermoplastic polymer are applied. This laminate is disclosed as being useful as an overwrap for a soft or hard pack or as a sealed inner liner for a soft or hard pack. Although the package overwrap lamirlate disclosed by Langley et al. is between about 1.5 to about 2.5 mils, it is substantially compatible with conventional cigarette packaging equipment and has an external appearance comparable to conventional cigarette packages.

It would be desirable to provide a heat sealable high barrier cigarette package overwrap of a gauge equal to or less than that of the conventional OPP overwrap for packages. Such an overwrap desirably would preserve the freshness and moisture content of the cigarettes contained in the package, thus, minimizing changes which might be detected by the consumer after passage of the normal period of time between cigarette manufacture and consumption. In addition, such an overwrap could increase the normal shelf life of the cigarettes or maintain a shelf life equal to or greater than normal shelf life under the most adverse storage conditions. Advantageously, such a cigarette package would also be compatible with existing cigarette manufacturing and packaging equipment to the extent that major modifications of that equipment are not required to maintain production rates at least equal to present rates of cigarette package production. In addition, it would be desirable to provide a high barrier cigarette package that has an external appearance at least comparable to conventional cigarette packages and also that may be opened in the same way as a conventional cigarette package. It would also be desirable to provide a high barrier cigarette package that has slip characteristics equivalent to or better than conventional cigarette packages.

SUMMARY OF THE INVENTION

The present invention provides a high barrier heat sealed package for smoking articles, such as cigarettes, cigars, cigarillos and the like. In the embodiments shown, the package overwrap is wrapped about a cigarette package having a rectangular parallelepiped shape with an overlapping longitudinal side seam and overlapping top and bottom folded end flaps and heat sealed in substantially the same locations as a conventional cigarette package overwrap. Alternatively, an overlapped seam can be provided on the top or bottom of the package and folded flaps can be provided and heat sealed on the sides of the package. The package overwrap is also suitable for wrapping cigarette packages having shapes other than a rectangular parallelepiped, including, for example, cylindrical or polyhedral shapes.

Although the barrier packaging material disclosed herein is especially useful in the packaging of smoking articles, it is also useful in packaging other articles or products, particularly those that are packaged in rectangular parallelepiped containers. Examples of other products that may be advantageously packaged according to the invention are chewing tobacco and pipe tobacco, the freshness and moisture content of which is desired to be maintained.

The barrier packaging material according to the invention comprises a base layer of a polymeric film, preferably a biaxially oriented heat-set polyethylene terephthalate film (PET) having a thickness of about 0.25 mils to about 1.25 mils which has been metallized by conventional vacuum deposition techniques with a layer of metal, preferably aluminum, having a thickness which will provide an optical density of about 1.5 to 3.0. The polyester film layer may have either a glossy surface finish or a matte finish so that after metallization with aluminum, the glossy surface film has a bright, shiny and highly-reflective surface and the matte finished film provides a soft, satin-like, low-reflectance surface. After metallizing, the PET film is wound onto rolls in preparation for printing.

The base layer may also be an oriented polypropylene single layer or coextruded film having a thickness of about 0.75 mils to about 1.25 mils or an oriented nylon film having a thickness of about 0.50 mils to about 1.0 mils. These materials are characterized by relatively high tensile and tear strengths and, when vacuum metallized with aluminum to the thickness described above for the PET film, have barrier properties substantially better than the conventional cigarette package overwrap. The oriented polymeric films useful in the practice of the invention are, as mentioned above, preferably biaxially oriented. However, it may be advantageous to provide the film with an unbalanced orientation in the biaxial directions of orientation. For instance, it may be desirable to provide a greater orientation to the polymeric film in the direction in which the tear tape is applied so as to reduce the possibility of cross or uneven tears in the overwrap film.

The metallized polymeric base layer film may be imprinted with a repeat design and/or other matter, e.g., brand specific information, directly on either the metallized or the non-metallized surface of the layer. Preferably, the metallized surface is protected so as to provide abrasion resistance for the metal coating. Depending upon the ink formulations used, it may be necessary to prime coat the surface of the base layer with an adhesion promoting material, such as polyethylene amine (PEI). Transparent, metallic filled and/or opaque printing inks are preferably applied by conventional printing techniques, such as the rotogravure or flexographic processes. Of particular advantage is the use of transparent printing ink which permits the reflectivity of the metallized surface to be apparent through the printing ink and thereby provides attractive and differentiating presentations of both the graphics and the packaging materials. Inks utilizing polyester resin systems are preferred for their adhesion and physical resistance characteristics, however, ink systems based on nitro-cellulose or polyamides can also be utilized. It is also possible to print coupons or other promotional items and information on the inner surface of the overwrap.

After printing, or simultaneously with the printing of the designs, graphics, etc., a heat seal layer is applied to the printed and/or unprinted surfaces of the metallized film. In the preferred embodiment, a clear heat seal is applied in a predetermined repeat pattern on both surfaces of the metallized PET film, i.e., on the printed side and on the opposite unprinted side, at locations adjacent the side edges and along a transverse strip corresponding respectively to the top and bottom folded flaps and the longitudinal overlapped seam of the package overwrap. In certain embodiments of the invention, the heat seal layer may be applied to the entire surface of one or both sides of the metallized polymeric film.

The heat seal layers are preferably clear (but may also be translucent or opaque) thermoplastic materials having optimum hot tack characteristics and minimum sealing temperatures in the range of about 195° F. to about 275° F. Thermoplastic materials suitable for use as the heat seal layer include condensation polymers formed from ethylene gylcol and terephthalic acid (PET); copolymers of ethylene and vinyl acetate with vinyl acetate ranges of 4.5% to 28% (EVA); vinyl coatings formed from a free radical additional reaction of vinyl acetate and various vinyl monomers, acrylate esters, vinyl chloride, vinylidene chloride, dibutyl and other dialkyl maleates and other commercially available comonomers; polymers derived from the polymerization of a carboxylic acid monomer and ethylene reacted with sodium, potassium or zinc (ionomer); or a dispersion of modified polypropylene in a high boiling aliphatic hydrocarbon. The application weight of the heat seal polymers can range from 1.0 to 6.0 pounds per 3000 square feet of base layer (assuming application to one entire surface of the base layer) and provides heat seal width when pulled on an Instron according to conventional seal strength testing procedures.

The preferred heat sealant is a polyester thermoplastic applied at a weight of 1.0 to 3.0 pounds per 3000 square feet (assuming application to an entire surface of the base layer) which provides a seal strength of about 3.0 pounds per inch of seal width over a sealing temperature range of from about 210° F. to about 375° F. One important advantage of applying a heat seal layer to the overwrap film in a registered pattern rather than as a skin layer completely covering both sides of the overwrap film is that the slip characteristics of the overwrap of the invention will not be adversely affected by the composition of the heat seal layer, but will depend on the slip characteristics of the printed surface of the overwrap film. After printing and application of the heat seal layer or pattern, the metallized PET film is cut to width and subsequently wound onto rolls suitable for use in a machine for forming a cigarette package.

The package overwrap material comprising the printed metallized PET film with the registered heat seal layer pattern applied is used in conventional cigarette packaging apparatus to overwrap cigarettes contained within an inner wrap with a conventional tear tape. Each printed overwrap is cut from the roll, wrapped with a tear tape about an inner wrap containing cigarettes and heat sealed along its longitudinal seam at the transverse heat seal strip. The top and bottom end flaps are then folded over and heat sealed to form an opaque, high barrier cigarette package which has a substantially extended shelf life over conventional cigarette packages with a clear polypropylene overwrap.

It may be advantageous from the standpoint of reducing possible littering to seal the overwrap of the invention or portions thereof to the underlying inner wrap of the cigarette package so that the overwrap is not readily removable from the underlying inner wrap.

It is a particular advantage of the present invention that the polyester film overwrap has greater tear strength and puncture resistance than the conventional OPP film overwrap. In addition, the presence of the metallized layer on the PET film overwrap advantageously provides a package with a metallic luster or sheen which significantly enhances the appearance and perception of quality of the packaged product.

According to the present invention, the inner wrap underlying the PET film overwrap comprises only one wrap, which is preferably metal coated or metallized on the outer surface thereof. The preferred material for the inner wrap is a relatively thick paper material, although polymeric sheet material or laminates could be used. The preferred paper material has a weight in the range of about 30 lb/3000 ft$^2$ ream to about 80 lb/3000 ft$^2$ ream, and preferably about 54 lb/3000 ft$^2$ream. The paper material is provided on at least the outermost side thereof with a metal surface such as aluminum metel, which may be applied by adhesively laminating aluminum foil to the paper or by other suitable and equivalent processes, such as printing with an aluminum metal ink, vacuum deposition aluminum or transfer metallization according to U.S. Pat. No. 4,215,170. The inner wrap is provided with an outer metal surface primarily for decorative purposes and to provide the inner wrap with an appearance comparable to the inner wrap of conventional cigarette packages.

Since the inner wrap is the only wrap material underlying the thin PET film overwrap, the inner wrap must have a sufficient thickness and stiffness to prevent the rods of the smoking articles from forming a "ribbed" or "washboard" effect on the inner wrap surface which would also appear in the thin PET film overwrap and detract from the overall appearance of the package. The magnitude of this "ribbed" effect, of course, also depends to some extent on the diameter of the packaged smoking articles, therefore, the thickness of the inner wrap material may be different for different diameter smoking articles.

The use of a relatively thicker paper material for the inner wrap as compared with the paper of a typical inner wrap on a conventional cigarette package (e.g., a paper material having a weight of about 28 lb/3000 ft$^2$ ream), makes it more difficult to achieve an acceptable "lay flat" characteristic of the inner wrap at that portion of the inner wrap where the longitudinal edges overlap. This difficulty is exacerbated by the fact that the PET film overwrap itself is quite thin and tends to reveal the topmost longitudinal edge of the inner wrap on the side thereof where the overlap is located. According to another feature of the invention, this problem is solved by securing the outermost or topmost longitudinal edge of the inner wrap to the underlying portion of the inner wrap by any one of several equivalent methods. For example, one or more strips of pressure sensitive adhesive, a heat activatable lacquer or heat seal layers may be applied to the inner wrap adjacent the longitudinal edges so that when pressure and/or heat is applied to the inner wrap at the locations of such strips, the longitudinal edges of the inner wrap are secured to one another and caused to lay flat. Alternatively, a pressure-sensitive or heat-activatable adhesive tape may be applied along the longitudinal overlapping edge of the inner wrap to cause the same to lay flat.

Advantageously, if a pressure-sensitive or heat-activated material or layer is applied to the inner wrap at or adjacent the longitudinal edge overlap, such material or layer may be applied to the outer metal surface of the inner wrap so that it extends beyond the topmost overlapped longitudinal edge. Such additional adhesive material or layer may be adhered to the metallized polymeric overwrap film by pressure and/or heat to prevent the overwrap from being separated from the inner wrap. This feature accomplishes two desirable objectives. First, it eliminates any need to provide printing or other graphic or brand specific information on the outer surface of the inner wrap, and, secondly, as mentioned above, it reduces possible littering.

If the material or layer applied to the outer surface of the inner wrap to secure the overwrap thereto is heat-activatable, it may advantageously be applied to that portion of the inner wrap outer surface underlying the longitudinal heat seal seam of the overwrap. In that way, when the longitudinal seam of the overwrap is heat sealed, the overwrap will be simultaneously heat sealed to the inner wrap along that longitudinal seam.

Another feature of the invention resides in the application by printing or other process of a strip of color on the inner wrap in a location to underlie the tear tape. This printed strip has a color corresponding to or complementary with the color of the overwrap of the finished package. Occasionally, and especially with a substantially balanced biaxially oriented polymeric film, the tear tape tears the overwrap film unevenly, e.g., at an angle with respect to the tear tape. Where the color of the overwrap differs from the color of the underlying metal on the inner wrap, the uneven tear is highlighted by the inner wrap and detracts from the overall appearance of the package. Although, as discussed above, an unbalanced oriented film may be used to solve this problem, if the color of the inner wrap underlying the uneven tear in the overwrap is the same color as the overwrap, the uneven tear will be less obtrusive and noticeable. Such a printed strip of color is easily provided and can be included on the inner wrap regardless of the orientation characteristics of the polymeric film overwrap.

With the foregoing and other advantages and features of the invention that will become hereinafter apparent, the nature of the invention may be more clearly understood by reference to the following detailed description of the invention, the appended claims and to the several views illustrated in the attached drawings.

DETAILED DESCRIPTION OF PREFERRED EMBODIMENTS

Figure 1:
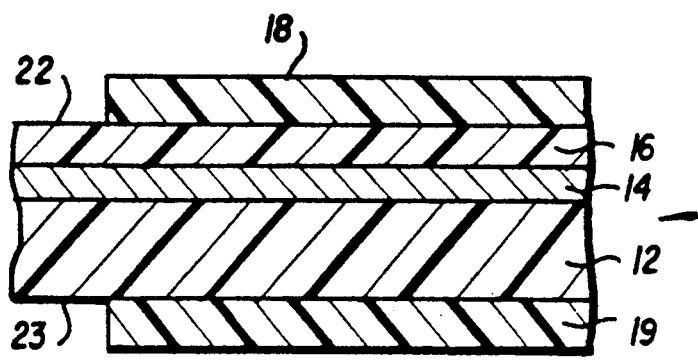
FIG. 1 is a partial cross-sectional view of the barrier overwrap material of the present invention.

Referring now to the drawings, FIG. 1 illustrates a partial cross-section of the barrier material used to form the overwrap of a cigarette package according to the invention which is designated by reference numeral 10. The overwrap 10 comprises a polyester film substrate layer 12, preferably a biaxially oriented, heat stabilized polyethylene terephthalate (PET) single layer or multilayer film having a thickness ranging from about 0.25 mils to about 1.25 mils and preferably 0.48 or 0.60 mils. The orientation of the film may be balanced or unbalanced as desired. The polyester film layer 12 may have a glossy or a matte finish as is conventional in the art.

A metal layer 14 is disposed on one surface of the layer 12 and is applied thereto by a conventional vacuum deposition process preferably to an optical density of about 1.5 to about 3.0. The vacuum deposition technique can be used to coat or metallize a film with a variety of metals such as zinc, nickel, silver, copper, gold, indium, tin, stainless steel, chromium, titanium or aluminum. An aluminum coating is preferred acccording to the present invention.

PET films suitable for use in the present invention are commercially available from a number of sources, such as ICI Americas Inc., Film Drive, Wilmington, Del. 19897, American Hoechst Corporation, Greer, S.C. 29652, BCF-Bemis Converter Films, Oshkosh, Wis. 54903, E. I. DuPont de Nemours & Company, 1007 Market Street, Wilmington, Del. 19898, and Sumitomo Corporation of America, 611 S. Myrtle Avenue, Clearwater, Fla. 34616. Vacuum metallization of the films useful in the invention can be performed by a number of companies, such as Camvac Intl., Inc., Morristown, Tenn. 37814, Vacumet Corporation, 20 Edison Drive, Wayne, N.J. 07470. The films may be metallized with a shiny, highly reflective surface or with a satin-like, low-reflectance surface depending on whether the polyester film substrate had a glossy or a matte finish prior to metallizing. Films with both types of surfaces are useful in making packages according to the present invention.

The metallized PET film is imprinted on either surface thereof with a printing layer 16 which may include both transparent and opaque inks applied to the film with conventional rotogravure or flexographic printing techniques. Suitable inks include those made by Converters Ink Company, 1301 S. Park Avenue, Linden, N.J. 07036 under the designations Versaflex, Tem-Pro-Flex and Polestrin. When aluminum metallized PET film is used as an overwrap in the packaging of cigarettes according to the invention, it is advantageous to leave selected areas of the film unprinted so that such areas retain an aluminum foil-like appearance common in many ,cigarette packages. Such areas may include the top and bottom folded flaps of the overwrap. In this way, the cigarette package of the invention may be provided with an appearance comparable to conventional cigarette packages.

Layers 18 and 19 are fusion heat sealable layers composed of a thermoplastic polymer having a minimum sealing temperature in the range of 195° F. to 275° F. "Fusion heat sealable layer" is defined as a layer that forms a fusion heat seal to itself upon the application of heat above the minimum sealing temperature and upon the application of pressure of a given amount for a given dwell time as is well known and understood by those skilled in the art. Layers 18 and 19 have coating application weight range from about 1.0 to about 6.0 pounds per 3000 square feet, perferably between about 1.0 and 3.0 pounds per 3000 square feet, and may be composed of any fusion heat sealable material known to those skilled in the art, such as ethylvinyl acetate copolymers, vinyls, ionomers, or modified polypropylenes and preferably polyesters. The layers 18 and 19 are applied to one or both sides of the barrier film in a predetermined pattern and in registry with the printed layer 16.

Figure 2:
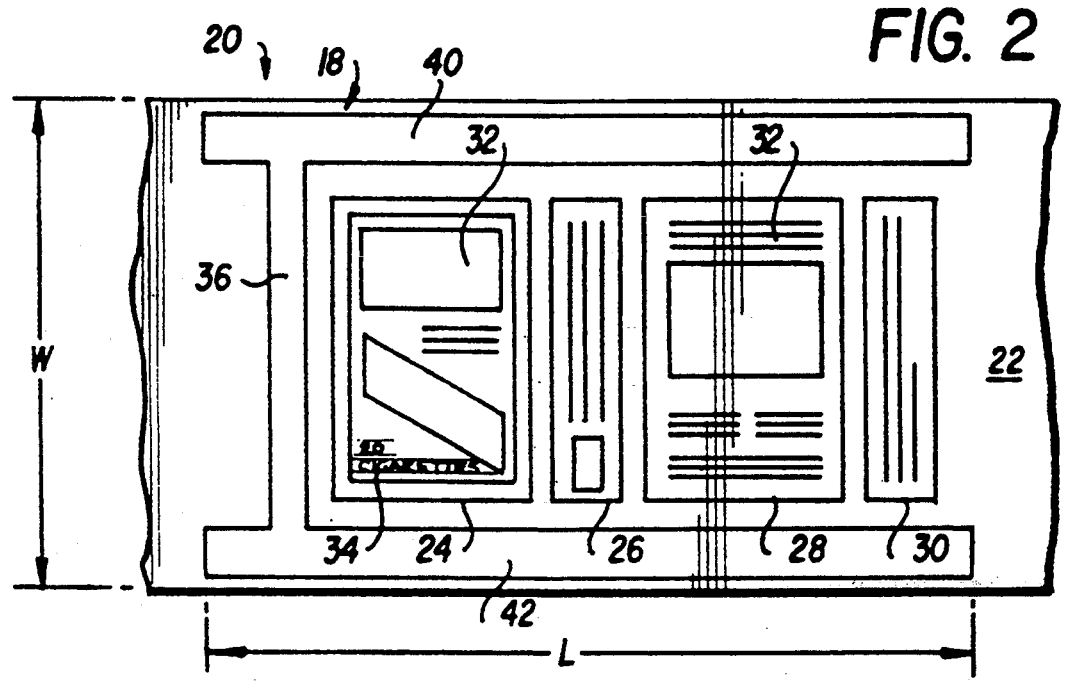
FIG. 2 is a plan view of one side of a portion of a strip of the barrier overwrap material showing one preferred pattern of the registered heat seal layer on said one side.
Figure 3:
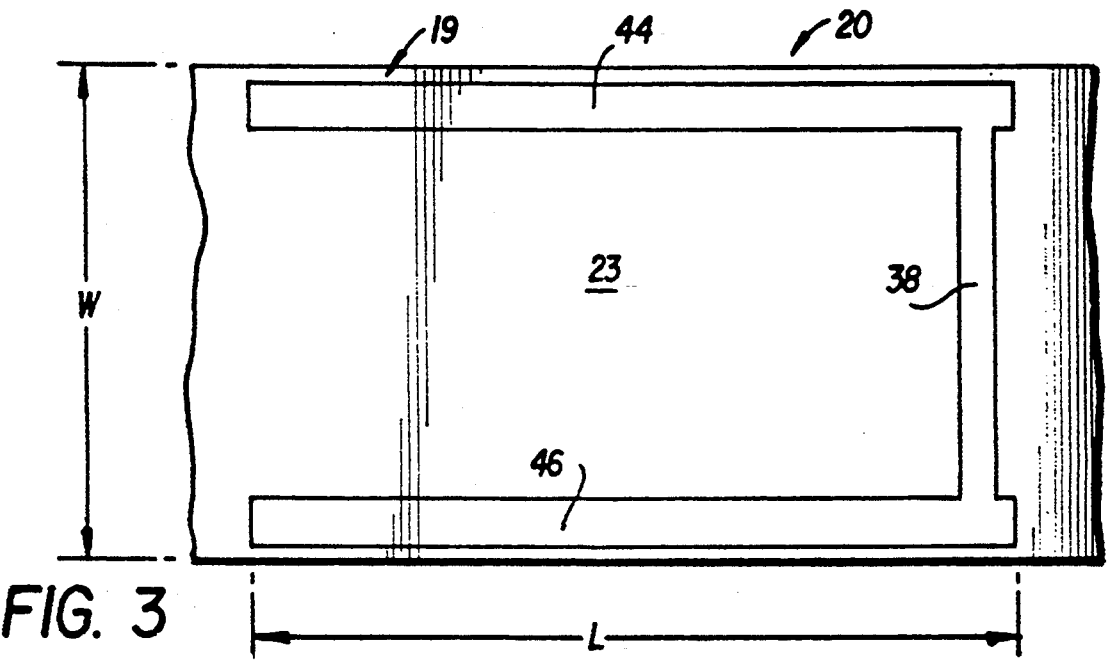
FIG. 3 is a plan view of the other side of the strip of barrier overwrap material of FIG. 2 showing the preferred heat seal layer pattern on said other side.

FIGS. 2 and 3 illustrate the opposite sides of a portion of a web 20 of the printed metallized PET film 10 of FIG. 1. FIG. 2 shows the top surface 22 or the outer, printed side of the web 20 and FIG. 3 shows the bottom surface 23 which is the PET film side of the web directly opposite the side shown in FIG. 2. The material web of FIGS. 2 and 3 is supplied to the cigarette packaging apparatus from a roll of material having a width W in the same way that conventional OPP overwrap film is supplied to the cigarette packaging apparatus.

Referring now to FIG. 2, the top aluminum metallized surface 22 of web 20 may be printed over its entire surface or only a portion thereof, for example, with a yellow transparent ink. When printed with yellow transparent ink, the printed surface 22 will be a golden color having either a shiny or a satin-like appearance depending on whether the underlying PET film has a glossy finish or a matte finish. Other colors of transparent printing inks may be printed on the aluminum metallized surface 22 to yield a variety of glossy or satin-like metallic finishes on the barrier material. For example, four areas 24,26,28,30 on the surface 22 correspond to the respective sides, front and back walls of the rectangular parallelepiped cigarette package and may be imprinted with transparent or opaque inks with appropriate designs 32, printed matter 34 or other information. The bottom surface 23 of the web 20 as shown in FIG. 3 is the interior surface of the barrier overwrap and may be printed if desired with indicia comprising a coupon or other promotional information.

After imprinting of the layer 16 onto the surface of aluminum metallized layer 14, the fusion heat sealable layers 18,19 are applied in predetermined patterns in registry with the printed surface 16 by a conventional printing process, e.g., a rotogravure roller. For sealing the longitudinal side seam of the package overwrap, transverse strips 36,38 of the fusion heat sealable layers 18,19 are applied to the top and bottom surfaces 22,23, respectively, of the web 20. When an appropriate length L of the web 20 is cut to form an overwrap for an individual cigarette package, the strips 36,38 are positioned to overlie one another for heat sealing. Similarly, the edge patterns 40,42 of the heat sealable layer 18 on the surface 22 and the edge patterns 44,46 of the heat sealable layer 19 on the surface 23 are optimally arranged for heat sealing the top and bottom folded flaps of the overwrap. The region of the top or outer surface 22 of the overwrap between the heat seal edge patterns 40,42 are advantageously not coated with a heat sealable layer so as to retain the slip characteristics of the printed metallized layer of the overwrap. Although the bottom or inner surface 23 of the overwrap is provided with the heat sealable layer 19 in a predetermined pattern, the heat sealable layer could be applied to the entire bottom, or inner surface 23 of the overwrap web 20 since the slip characteristics of that surface are not critical.

Figure 4:
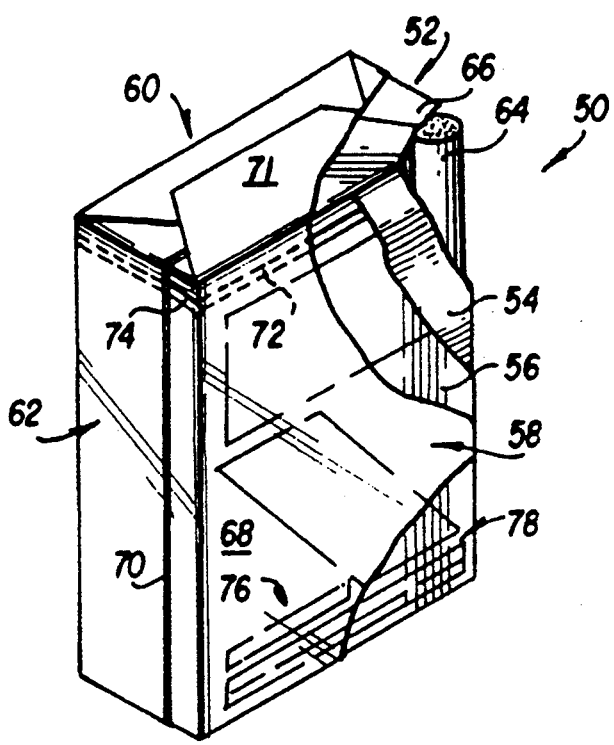
FIG. 4 is a perspective view, partly broken, of a first embodiment of a high barrier "soft pack" cigarette package according to the present invention.

Referring to FIG. 4, a first embodiment of the cigarette package according to the invention is designated generally by reference numeral 50. Package 50 is a "soft pack" and comprises a soft container 52 which typically contains twenty cigarettes 64 arranged in a 7-6-7 matrix within the container. The container 52 typically includes an inner wrap 54 and an outer printed or label wrap 56. A preferred inner wrap 54 is a metal foil/paper laminate, such as aluminum foil adhesively bonded to 28 pound bond paper. The outer label wrap 56 is preferably a paper material, such as clay coated 44 pound litho sheet and includes printed indicia (e.g., designs, graphics, brand specific information, etc.) positioned to be located on a specific wall surface of the package and corresponding with the printed indicia on the overwrap material. The package 50 shown in FIG. 4 has a front wall 58, a top wall 60 and a side wall 62. Not shown in FIG. 4 are the back wall opposite front wall 58, the bottom wall opposite top wall 60, and the side wall opposite side wall 62. An example of a soft container for cigarettes is disclosed in U.S. Pat. No. 3,695,422, the disclosure of which is incorporated herein by reference.

The inner wrap laminate 54 is folded into a six-sided rectangular parallelepiped to contain the cigarettes 64 in such a way that the paper side of the laminate is on the inner side of the container confronting the cigarettes 64. The outer label wrap 56 is folded so as to cover the front, back, bottom, and two side walls of the inner wrap leaving the top folded wall 66 of the inner wrap 54 uncovered by the outer wrap 56. Typically, an adhesive is applied to the outer label wrap 56 at the bottom and at the longitudinal side seam (not shown) to hold the wrap in place.

The soft container 52 is provided with a high barrier overwrap 68 cut from the web 20 shown in FIGS. 2 and 3. The overwrap 68 is wrapped about the front, back, and side walls of soft container 52 and heat sealed along longitudinal side seam 70 where fusion heat sealable strips 36,38 (FIGS. 2 and 3) overlie one another. The top and bottom flaps of the overwrap are folded over in the same way as a conventional OPP overwrap and are heat sealed together along overlapping top flap or seam 71 and the corresponding flap/seam (not shown) on the bottom of the package.

A tear tape 72 for slitting the overwrap 68 is interposed between the outer label wrap 56 and the overwrap 68 of the package so as to circumscribe the soft container 52. A free end 74 of the tear tape 72 protrudes from beneath the overwrap 68 at the heat sealed longitudinal seam 70 and functions as a tab for the smoker to grasp and tear away the heat sealed top of the overwrap 68.

It will be appreciated that to form a substantially impervious high barrier seal, the top and bottom folded end flaps or seams and the longitudinal side seam include heat seals between the heat seal layers 18 and 19, as well as heat seals between a portion of heat seal layer 18 to another portion of heat seal layer 18 and heat seals between a portion of heat seal layer 19 and another portion of heat seal layer 19. The manner in which the heat seal layers 18,19 of the overwrap 68 are sealed together corresponds generally to that described in U.S. Pat. No. 4,807,745 the disclosure of which is incorporated herein by reference.

Heat sealing is preferably performed in the conventional manner by application of heat to the fully folded overwrap at the top and bottom of the package. The thinner gauge of the metallized PET overwrap (48 to 60 gauge) compared to the conventional OPP overwrap (80 gauge), the greater heat conductivity of the metallized PET overwrap resulting from the metal layer 14 (FIG. 1), and the higher melting and thermal distortion temperature of the polyester film, provides greater flexibility in the selection of the heat sealing temperature, sealing pressure and dwell time, permitting production of high quality packages at high packaging speeds (in excess of 400 packages per minute).

The overwrap 68 of the package 50 of the present invention is designed to be used in conventional soft pack overwrapping apparatus, such as a Model No. 716 from Scandia Packing Machinery, Clifton, N.J. or a Model 4350 Packager manufactured by G. D. Societa per Azioni, Bologna, Italy. Such apparatus is capable of providing the container 52 with the circumscribing heat sealed overwrap 68 and a tear tape 72 as will be apparent to the skilled artisan.

Referring again to FIG. 4, cigarette package 50 is preferably constructed so that the outer label wrap 56 and the overwrap 68 are aligned to provide substantial registration of the printed matter on the surfaces of the outer label wrap 56 and the overwrap 68 as shown, for example, in FIG. 4 by the printed matter 76 on the overwrap 68 and the printed matter 78 on the outer label wrap 56. Thus, when all or a portion of the overwrap 68 is removed from the underlying container 52, the location of the printing which appears on the outer label wrap substantially matches the location of the printing on the overwrap.

Figure 5:
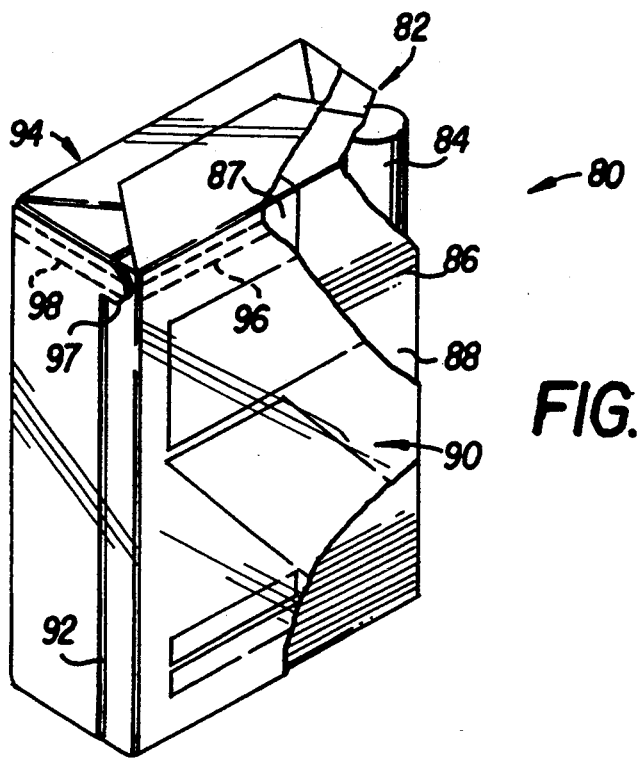
FIG. 5 is a perspective view, partly broken, of a second embodiment of a high barrier "soft pack" cigarette package according to the present invention.

Now referring to FIG. 5, another embodiment of the cigarette package according to the invention is designated generally by reference numeral 80. Package 80 is also a "soft pack," type of cigarette package and comprises a soft container 82 which typically contains twenty cigarettes 84 arranged in a 7-6-7 matrix within the container. The FIG. 5 embodiment differs from that of FIG. 4 primarily in the construction of the package underlying the overwrap as described hereinafter.

The container 82 comprises an inner wrap 86 made of a relatively thick paper material having a weight of from about 30 lb/3000 ft$^2$ ream to about 80 lb/3000 ft$^2$ ream and preferably about 54 lb/3000 ft$^2$ream. The exterior of inner wrap 86 has a metal coating or metallized surface 88 which may be provided by any one of several processes. For example, the inner wrap 86 may be a metal foil/paper laminate, such as an aluminum foil having a thickness in the range of about 0.0002 inches to about 0.00035 inches. For the preferred paper weight of about 54 lb/3000 ft$^2$ ream, an aluminum foil having a thickness of about 0.000285 inches is used. The metal coating 88 may also be applied by vacuum deposition in a manner similar to that described above for the metal layer 14 of the overwrap 10, by a process known as transfer metallization described in U.S. Pat. No. 4,215,170 the disclosure of which is incorporated herein by reference, by printing a metallic paint or ink, such as aluminum metal ink, on the inner wrap 86, or by any other suitable metal coating or metallizing process.

The inner wrap 86 is folded into a six-sided rectangular parallelepiped to contain the cigarettes 84 in such a way that the paper side is on the inner side of the container confronting the cigarettes. An adhesive backed paper strip 87 may be provided on the top (and bottom) flap of the inner wrap to secure the inner wrap 86 in position about the cigarettes 84.

The container 82 is provided with a high barrier overwrap 90 cut from the web 20 shown in FIGS. 2 and 3. The overwrap 90 is wrapped about the front, back and side walls of container 82 and heat sealed along longitudinal side seam 92 where fusion heat sealable strips 36, 38 (FIGS. 2 and 3) overlie one another. The top and bottom flaps of the overwrap are folded over in the same way as a conventional OPP overwrap and are heat sealed together along overlapping top flap or seam 94 and the corresponding flap/seam (not shown) on the bottom of the package 80. Heat sealing of the overwrap is accomplished in substantially the same manner as described above in connection with the package shown in FIG. 4.

A tear tape 96 for slitting the overwrap 90 is interposed between the overwrap 90 and the inner wrap 86 so as to circumscribe the container 82. A tab 97 is formed on the longitudinal edge of the overwrap at the seam 92 in overlying relation with a free end 98 of the tear tape 96. Preferably, the tear tape 96 is adhesively bonded to the inside of the overwrap 90 by a pressure sensitive adhesive. The tab 97 and free end 98 of the tear tape 96 may be grasped by the smoker and pulled toward the seam 92 to tear away the heat sealed top seam 94 of the overwrap.

Figure 6:
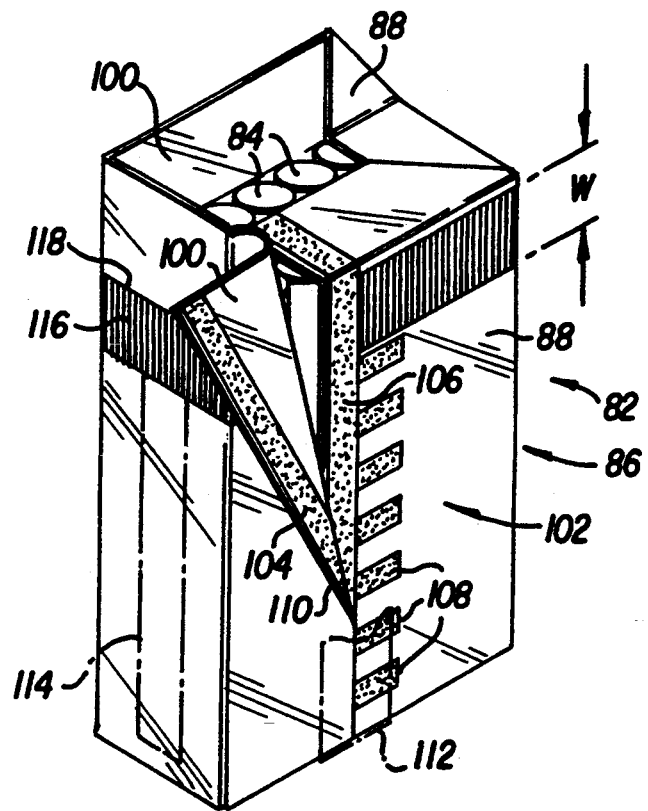
FIG. 6 is a perspective view of the inner wrap of the "soft pack" cigarette package of FIG. 5, shown partly unfolded and unsealed and without the overwrap.

Referring now to FIG. 6, the construction of the inner wrap 86 of container 82 will be described. The inner wrap 86 has an outer metallic surface which may be an aluminum foil 88 and an inner paper sheet 100. The inner wrap 86 is wrapped about the cigarettes 84 and has an overlapping longitudinal seam 102 located approximately in the center of the rear (or front) panel of the package. Pressure-sensitive or heat-activatable adhesive strips 104, 106 are applied to the paper sheet 100 of the inner wrap and to the aluminum foil 88 adjacent the seam 102. Adhesive strip 106 may be intersected by a plurality of transverse strips 108 which extend beyond the free edge 110 of the topmost overlapping portion of the seam 102.

When the inner wrap 86 is wrapped about the cigarettes 84 in the cigarette packaging machinery, pressure and/or heat is applied to the longitudinal seam 102 so as to bond the adhesive or heat seal strips 104, 106 to one another and cause the seam 102 to lie substantially flat. Alternatively, a pressure sensitive or heat activatable tape 112 (shown in broken phantom lines) may be applied along the length of the longitudinal seam 102 in overlapping relation to the free edge 110.

After the longitudinal seam 102 has been sealed or taped as described above, the top and bottom flaps/seams are folded over in the conventional manner and one or both of the flaps is secured by a conventional adhesive-backed strip, such as the strip 87 shown in FIG. 5. In that form, the container 82 is transferred to the overwrap section of the cigarette packaging machine where the overwrap is wrapped about the container 82 to form package 80.

After the overwrap 90 has been applied to the container 82 and heat sealed at the longitudinal side seam 92 and the top and bottom flaps, pressure and/or heat may be applied to the package 80 in the region of the transverse strips 108 to cause the overwrap 90 to be adhered to the inner wrap 86. Alternatively, a heat activatable adhesive strip 114 (shown in phantom lines) may be applied to the foil surface 88 so as to be disposed beneath the heat sealed side seam 92 of the overwrap 90 (FIG. 5). Thus, when the side seam 92 is heat sealed, the overwrap 90 will be adhered to the inner wrap 86 along the strip 114. Both the above-described strips 108 and 114 are advantageously used to keep the overwrap 90 secured to the inner wrap 86 to reduce the possibility of litering and to avoid the need to provide printed label matter on the inner wrap. It will be apparent to those skilled in the art in view of the foregoing teachings that the overwrap may be secured to the inner wrap by other equivalent means.

Still referring to FIG. 6, the inner wrap 86 is provided on its outer foil surface 88 with a colored strip 116 that circumscribes the container 82 near the top end thereof and a location so as to underlie tear tape 96. Strip 116 has a color that corresponds substantially with the exterior color of the overwrap 90 for a purpose to be described.

When the tear tape 96 is grasped by tab 98 and pulled around the perimeter of the package 80, it tears the overwrap along a line or lines generally parallel to the length of the tear tape. Occasionally, the tear line is uneven such that the tear line drifts downwardly as the tear tape is pulled around the package. If that occurs, the colored strip 116 will provide a colored background against which the uneven tear line will be viewed. Since the colors of the strip 116 and the overwrap 90 are the same, the uneven tear line will not be apparent and will blend with the background color such that the uppermost edge 118 of the strip 116 will appear to be the actual tear line. The width W of the strip 116 is sufficiently great to effectively conceal most of the uneven tear lines to be expected under normal conditions. In lieu of or in addition to the colored strip 116, the biaxial orientation of the overwrap may be unbalanced to such an extent that the tear line generated by tear tape 96 will be substantially parallel to the tear tape.

EXAMPLE

Barrier overwrap materials were prepared according to the following procedure:

Polyester single layer and coextruded multilayer polyester oriented (PET) films having high gloss, low haze, and good handling properties in 48 and 60 gauge thicknesses were obtained from ICI Americas Inc. The films are sold under the designations Melinex 800, Melinex 850 and Melinex 851. The PET films were vacuum metallized with aluminum according to conventional processes by Camvac Intl. Inc. and Vacumet Corporation to optical densities of 2.0. The films were then printed on both the metallized and unmetallized surfaces by conventional rotogravure printing techniques using the following rotogravure printing inks: Versaflex GP-4252 and GP-4253; Tem-Pro-Flex CP-116997, CP-116974, CP-116971, CP-116998, CP-116973, and CP-116512 each with extender CP-116484; and Polestrin CP-116981 with extender V-91511 all manufactured by Converters Ink Company.

A heat seal layer consisting of a modified polyester, Designation Number 9762-001, available from the Valspar Corporation, 2000 Westhall Street, Pittsburgh, Pa. 15233 was applied to the printed metallized PET film also by conventional rotogravure techniques with a cylinder etched to deliver an application weight of 1.0 lbs/ream. The modified polyester coating is highly transparent and has a coefficient of friction of between 0.15 and 0.30. The heat seal coating was tested by application in three different ways and used to overwrap soft pack cigarette packages in conventional overwrapping apparatus made by G. D. Societa per Azioni and Scandia. In the first test, the heat seal layer was applied as an overallocating to the entire inner unmetallized surface of the package overwrap. The printed design was register-applied to the outer metallized surface of the overwrap with a subsequently register-applied heat seal layer in the regions identified by reference numerals 36, 40, 42 on FIG. 2 where an out-to-out or an in-to-out seal would be required during the flap folding and sealing process. In the second test, the heat seal layer was applied as an overall coating on the metallized surface of a coextruded multilayer PET film (ICI Melinex 850 and 851) which was used as the inside surface of the package overwrap. The printed design was applied to the unmetallized side of the overwrap film. During the heat seal process, the multilayer PET film overwrap was folded and its outer surface was sealed to itself or to the inner heat seal layer. In the third test, the heat seal layer was register-applied to the inner layer in the regions identified by reference numerals 38, 44, 46 on FIG. 3. The outer surface was register printed with the heat seal layer applied in the regions identified by reference numerals 36, 40 42 on FIG. 2 where an out-to-out or an in-to-out seal would be required during the folding and sealing process.

Each of the three test films were slit into widths appropriate for the cigarette package overwrapping machinery and wound onto rolls for use in overwrapping conventional soft packs. The overwrap equipment utilized is capable of overwrapping cigarette packages with conventional OPP overwrap at rates up to 500 packages per minute. A rate of 470 packages per minute was experiment-tally achieved with the three test overwraps on the GD overwrapping apparatus. Comparative moisture and oxygen barrier tests on the metallized PET overwrap film of the invention compared with a conventional 80 gauge OPP overwrap gave the following results:

TABLE 1

| | Moisture Transmission (gms/100 in$^2$/24 hr.) at 100° F., 90% RH | Oxygen Transmission (cc/100 in$^2$/24 hr.) at 73° F., 0% RH |
|---|---|---|
| 48 ga. metallized PET | 0.038 | 0.1 |
| 80 ga. OPP | 0.516 | 113.0 |

A standard shelf life study was conducted to determine the moisture loss (or gain) over time of the tobacco of cigarettes packaged in three types of packages, namely, unwrapped standard cartons, standard cartons overwrapped with 80 gauge OPP and standard cartons overwrapped with metallized PET (MPET) according to this invention. All standard cartons contained cigarette packages overwrapped with 80 gauge OPP. Sample cartons for the shelf life study were selected from a plurality of standard cartons manufactured at the same time to insure that all sample cartons had the same initial moisture content. Some of the sample cartons were overwrapped with 80 gauge OPP, some were overwrapped with MPET and some were not overwrapped (i.e., unwrapped). To establish the initial moisture content of the cigarette tobacco packaged in the sample cartons, tobacco from one of the sample cartons was density of about 1.5 to about 3.0. The vacuum removed from the cigarettes in that carton and the actual moisture content of the tobacco as a percentage of total tobacco weight was determined according to standard procedure. That value of actual moisture content represented the initial moisture content of the tobacco in all sample cartons. The sample cartons were weighed to determine the initial weight for each carton at the initial moisture content. The cartons were then divided into three groups, each group including cartons of each type, i.e., unwrapped, 80 ga. OPP overwrap and MPET overwrap. Each group of the three carton types was placed in one of three different controlled environments of a given temperature (T) and relative humidity (RH).

Periodically, the cartons of each group were weighed and, based on the initial moisture content and the difference in weight from the initial weight of each sample carton, the moisture content of the tobacco in each carton was calculated. The average moisture content of the sample cartons of each type after seven (7) weeks is presented in Table 2 below.

TABLE 2

| T°F/RH % | INITIAL MOISTURE CONTENT % | MOISTURE CONTENT % AT 7 WEEKS | | |
|---|---|---|---|---|
| | | Std Carton Unwrapped | Std Carton 80 ga. OPP | Std Carton MPET |
| 98/20 | 12.3 | 7.4 | 9.9 | 11.9 |
| 76/34 | 12.3 | 11.0 | 11.8 | 12.2 |
| 88/80 | 12.3 | 14.2 | 12.9 | 12.3 |

Although certain presently preferred embodiments of the invention have been specifically illustrated and described herein, it will be appreciated by those skilled in the art to which the invention pertains that many modifications and variations of the present invention are possible in light of the above teachings without departing from the spirit and scope of the invention. Accordingly, it is intended that the invention be limited only to the extent required by the appended claims and the applicable rules of law.

What is claimed is:

1. A barrier package for smoking articles comprising only an inner wrap and an overwrap, said inner wrap containing a plurality of smoking articles, said inner wrap comprising a paper material having a weight in the range from about 30 lb./3000 ft² ream to about 80 lb./3000 ft² ream and a metal coating on the outer surface thereof, said overwrap overwrapping the inner wrap, said overwrap being formed separately from the inner wrap and overwrapped separately about the inner wrap to form the outermost wrap of the package, said overwrap comprising a polymeric film having a vacuum deposited metal layer on one side thereof, said polymeric film being sealed to form said barrier package.

2. The package of claim 1, wherein said paper material has a weight of about 54 lb/3000 ft² ream and said metal coating is aluminum foil adhesively bonded to said paper material and having a thickness from about 0.0002 to about 0.00035 inches.

3. The package of claim 1, wherein said metal coating is vacuum deposited aluminum.

4. The package of claim 1, wherein said inner wrap has overlapping edges forming a longitudinal seam and means for bonding together said edges in a substantially lay flat condition.

5. The package of claim 4, wherein said bonding means comprises a pressure- and/or heat-activated adhesive layer interposed between the overlapping edges.

6. The package of claim 4, wherein said bonding means comprises a pressure sensitive adhesive tape.

7. The package of claim 1, including means for bonding at least a portion of the overwrap to the inner wrap to retain the overwrap on the inner wrap.

8. The package of claim 7, wherein said bonding means comprises a pressure- and/or heat-activated adhesive layer interposed between the overwrap and the inner wrap.

9. The package of claim 1, including a tear tape interposed between the inner wrap and the overwrap and circumscribing the package for tearing open the overwrap along at least one tear line, said overwrap being provided with a given color different from the color of the metal coating on the outer surface of the inner wrap, and a strip of said given color applied to and circumscribing said inner wrap at the location of said tear tape such that when said tear tape is operated to tear open the overwrap, the color strip on the inner wrap underlies said tear line.

10. The package of claim 1, wherein said polymeric film is oriented.

11. The package of claim 10, wherein said polymeric film has an unbalanced orientation.

12. The package of claim 1, including a tear tape interposed between the inner wrap and the overwrap for tearing open the overwrap along a given direction, said polymeric film being biaxially oriented and having a greater orientation in said given direction of tearing whereby the possibility of cross or uneven tears is reduced.

13. The package of claim 1, wherein said metal layer is aluminum.

14. The package of claim 1, wherein said paper material and metal coating is a metal foil/paper laminate.

15. The package of claim 1, wherein said metal coating on the paper material is a vacuum deposited metal coating.

16. The package of claim 1, wherein said metal coating on the paper material is a transfer metallization coating.

17. The package of claim 1, wherein said metal coating on the paper material is one of a metal paint or ink.

18. The package of claim 1, wherein said smoking articles are cigarettes.

19. A package for smoking articles comprising:
an inner wrap containing a plurality of smoking articles, said inner wrap comprising a paper material having a metal coating on the outer surface thereof;
an overwrap overwrapping the inner wrap, said overwrap comprising a polymeric film having a vacuum deposited metal layer on one side thereof; and
a tear tape interposed between the inner wrap and the overwrap and circumscribing the package for tearing open the overwrap along at least one tear line, said overwrap being provided with a given color different from the color of the metal coating on the outer surface of the inner wrap, and a strip of said given color applied to and circumscribing said inner wrap at the location of said tear tape such that when said tear tape is operated to tear open the overwrap, the color strip on the inner wrap underlies said tear line.

* * * * *

UNITED STATES PATENT AND TRADEMARK OFFICE
CERTIFICATE OF CORRECTION

PATENT NO. : 5,427,235
DATED : June 27, 1995
INVENTOR(S) : Mark S. Powell, et al It is certified that error appears in the above-indentified patent and that said Letters Patent is hereby corrected as shown below:

On the title page, item [56], References Cited, U.S. Patent Document, add --

```
4,862,680  9/1989   Krah
4,836,378  6/1989   Lephardt
4,599,275  8/1986   Hayashi et al.
4,508,218  4/1985   Focke et al.
4,344,998  8/1982   de Leeuw et al.
4,343,852  8/1982   Isaka et al.
4,286,712  9/1981   Focke
4,267,094  5/1981   Huhn et al.
2,112,523  3/38     Daller
3,278,016  10/66    Conti
4,996,096  2/91     Dew
4,883,698  11/89    Bothe et al.
4,704,325  11/87    Crocker
4,604,322  8/86     Reid
4,971,863  11/90    Hart
4,702,963  10/87    Phillips et al.  --
```

UNITED STATES PATENT AND TRADEMARK OFFICE
CERTIFICATE OF CORRECTION

PATENT NO. : 5,427,235  
DATED : June 27, 1995  
INVENTOR(S) : Mark S. Powell, et al It is certified that error appears in the above-indentified patent and that said Letters Patent is hereby corrected as shown below:

Column 14, line 55, delete "density of about 1.5 to about 3.0. The vacuum".

Signed and Sealed this

Twenty-eighth Day of May, 1996

Attest:

BRUCE LEHMAN

Attesting Officer        Commissioner of Patents and Trademarks